US009151571B2

(12) United States Patent
Russell (10) Patent No.: US 9,151,571 B2
(45) Date of Patent: Oct. 6, 2015

(54) CAMERA MOUNT APPARATUS AND SYSTEM

(71) Applicant: Robert Russell, Sikeston, MO (US)

(72) Inventor: Robert Russell, Sikeston, MO (US)

( * ) Notice: Subject to any disclaimer, the term of this patent is extended or adjusted under 35 U.S.C. 154(b) by 0 days.

(21) Appl. No.: 14/308,472

(22) Filed: Jun. 18, 2014

(65) Prior Publication Data

US 2014/0305024 A1 Oct. 16, 2014

Related U.S. Application Data

(63) Continuation of application No. 13/157,983, filed on Jun. 10, 2011, now Pat. No. 8,793,917.

(60) Provisional application No. 61/467,831, filed on Mar. 25, 2011.

(51) Int. Cl.

| | |
|---|---|
| *F41A 15/00* | (2006.01) |
| *F41G 1/387* | (2006.01) |
| *F41C 27/00* | (2006.01) |
| *F41G 1/38* | (2006.01) |
| *G03B 17/48* | (2006.01) |
| *G03B 17/56* | (2006.01) |
| *G03B 29/00* | (2006.01) |

(52) U.S. Cl.
CPC ............... *F41G 1/387* (2013.01); *F41C 27/00* (2013.01); *F41G 1/38* (2013.01); *G03B 17/48* (2013.01); *G03B 17/561* (2013.01); *G03B 29/00* (2013.01)

(58) Field of Classification Search
CPC .......... F41G 1/38; F41C 27/00; G03B 17/48; G03B 17/561; G03B 29/00
USPC .................................................. 42/111–148
See application file for complete search history.

(56) References Cited

U.S. PATENT DOCUMENTS

| | | | | |
|---|---|---|---|---|
| 2,933,992 | A * | 4/1960 | Bushnell et al. | 396/432 |
| 3,940,777 | A * | 2/1976 | Komine | 396/85 |
| 4,013,339 | A * | 3/1977 | Ando et al. | 359/556 |
| 4,078,864 | A * | 3/1978 | Howell | 356/397 |
| 4,290,219 | A * | 9/1981 | Boller et al. | 42/106 |
| 4,409,475 | A * | 10/1983 | Zehnpfennig | 250/224 |
| 4,815,822 | A * | 3/1989 | Bramhall | 359/601 |
| 5,026,158 | A * | 6/1991 | Golubic | 356/252 |
| 6,019,326 | A * | 2/2000 | Baerwolf et al. | 248/177.1 |
| 6,819,495 | B2 * | 11/2004 | Shani et al. | 359/630 |
| 7,121,036 | B1 * | 10/2006 | Florence et al. | 42/123 |
| 7,194,204 | B2 | 3/2007 | Gordon | |
| 7,333,270 | B1 * | 2/2008 | Pochapsky et al. | 359/634 |
| 7,369,302 | B2 * | 5/2008 | Gaber | 359/353 |
| 7,614,805 | B2 | 11/2009 | Showalter | |
| 7,739,822 | B1 | 6/2010 | Holmberg | |
| 7,891,131 | B2 | 2/2011 | Holmberg | |
| 8,656,624 | B2 * | 2/2014 | Holmberg | 42/90 |

* cited by examiner

*Primary Examiner* — Samir Abdosh
(74) *Attorney, Agent, or Firm* — Haugen Law Firm PLLP (57) ABSTRACT

This disclosure relates to an apparatus for mounting a camera onto a firearm and an associated device for capturing images and recordings of a firearm target. The apparatus allows for easy attachment of cameras of varying sizes onto the scope of a firearm and along the same longitudinal axis of the scope. The apparatus comprises a sleeve connected to a scope of a firearm, the sleeve being hallow and having a longitudinal axis longitudinal axis forming an unobstructed axial bore and generally coaxial with a longitudinal axis of the scope; a base member with a hole and adapted to receive a camera with the hole of the base member positioned adjacent to the lens of the camera and the longitudinal axis of the camera lens is generally coaxial with the longitudinal axis of the scope.

18 Claims, 9 Drawing Sheets

CAMERA MOUNT APPARATUS AND SYSTEM

CROSS-REFERENCE TO RELATED APPLICATIONS

This application claims benefit of and priority to U.S. patent application Ser. No. 13/157,983 filed Jun. 10, 2011 and U.S. Provisional Application Ser. No. 61/467,831 filed Mar. 25, 2011, the entire disclosures of which are herein incorporated by reference.

FEDERAL SPONSORSHIP

Not Applicable

JOINT RESEARCH AGREEMENT

Not Applicable

TECHNICAL FIELD

This disclosure relates to mount apparatuses for photo and video cameras, including smartphones and other cameras, and more particularly, to an improved mount on a firearm for supporting the cameras.

BACKGROUND

Hunting is a popular recreational pastime in the United States and many other countries throughout the world. It has become increasingly common in recent times to record or photograph the hunt through the use of cameras and video cameras. As a result, mounting cameras and other electronic devices to a firearm in a manner that does not impede the hunt has become desired by those in the field of hunting, particularly the ability to both view the target while allowing for accurate firing of the firearm. Obtaining such a record of the hunt allows the hunter to later review his or her shots from the "eye" of the camera.

Additionally, with the advent of internet-enabled cameras, users can instantaneously email, text, or "post" pictures and videos. The devices also display images and recording before, during and after the taking of the photograph or recording. However, to be able to capture the hunt with these devices, a stand or additional person is needed, prohibiting the ability to view the hunt from the "eye" or scope of the camera. Thus, the need for such a mount to accommodate these devices has become all the more desired.

Accordingly, there is a need for an apparatus and firearm system designed to accommodate cameras and for mounting onto the scope of a firearm.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein is an apparatus for mounting a camera onto an optical device or scope. In an embodiment, the apparatus comprises an elongated, hollow sleeve for connecting to a scope or other optical device, the sleeve having a hollow longitudinal axis forming an unobstructed axial bore; a cylindrical aperture at one end of the sleeve, the cylindrical aperture having a longitudinal axis generally coaxial with the longitudinal axis of the sleeve; a second aperture at the opposite end of the sleeve, the second aperture having a longitudinal axis generally coaxial with the longitudinal axis of the cylindrical aperture; a connector for rigidly connecting the sleeve to the scope; and a base member connected to the sleeve, the base member comprising a hole positioned adjacent to the second aperture, the base member being adapted to receive a camera having a lens having a longitudinal axis. In this embodiment, when the sleeve is connected to the scope, the cylindrical aperture is aligned with the scope and the longitudinal axis of the scope is generally coaxial with the longitudinal axis of the sleeve. Additionally, when the camera is attached to the base member, the hole of the base member is positioned adjacent to the lens of the camera and the longitudinal axis of the lens is generally coaxial with the longitudinal axis of the optical device or scope.

In one embodiment, the base member is a substantially planar plate comprising a bore or hole positioned adjacent to the second aperture. In such an embodiment, the apparatus may further comprise flanges extending substantially perpendicular from the plate of the base member. In this embodiment, the flanges are sized and shaped to secure the camera onto the base member. In such an embodiment, the apparatus may further comprise a clamp adapted to receive the camera. Additionally, the apparatus may further comprise a flange hingedly connected to the plate.

In another embodiment, the apparatus further comprises a means for securing the camera onto the base member. In yet another embodiment, the base member is removably connected to the sleeve.

In an embodiment, the connector may comprise various different configurations. For example, the connector may be an adapter connected over the scope and the sleeve, the adapter being cylindrically-shaped and hollow and the adapter having a longitudinal axis generally coaxial with the longitudinal axis of the scope and sleeve. The connector may also be an adapter secured to the scope, the adapter being cylindrically-shaped and hollow, the adapter having a longitudinal axis generally coaxial with the longitudinal axis of the scope and sleeve; wherein the sleeve is placed over the adapter, the sleeve being removably fastened to the adapter. Additionally, the connector may be a rim comprised of mirrored pieces extending substantially perpendicular from the sleeve; and a screw. In such an embodiment, the pieces of the rim are tightened with the screw to connect the sleeve to the scope.

In one embodiment of the apparatus, the sleeve is cylindrically shaped. In such an embodiment, when the sleeve is connected to the optical device or scope, the diameter of the cylindrical aperture may be equal to or greater than the outer diameter of an eyepiece of the optical device or the outer diameter of the scope.

Also disclosed herein is a device for capturing images and recordings of a firearm target, the device comprising: a firearm comprising a scope having a longitudinal axis; a camera comprising a lens having a longitudinal axis; an apparatus for mounting a camera onto a firearm, the apparatus comprising: an elongated, hollow sleeve for connecting to the scope, the sleeve having a hollow longitudinal axis forming an unobstructed axial bore; a cylindrical aperture at one end of the sleeve, the cylindrical aperture having a longitudinal axis generally coaxial with the longitudinal axis of the sleeve; a second aperture at the opposite end of the sleeve, the second aperture having a longitudinal axis generally coaxial with the longitudinal axis of the cylindrical aperture; a connector for rigidly connecting the sleeve to the scope; and a base member connected to the sleeve, the base member comprising a hole positioned adjacent to the second aperture. In such an embodiment, the sleeve is connected to the scope in such a manner that the cylindrical aperture is aligned with the scope and the longitudinal axis of the scope is generally coaxial with the longitudinal axis of the sleeve. Additionally, the camera is attached to the base member in such a manner that the hole of the base member is positioned adjacent to the lens of the camera and the longitudinal axis of the lens is generally coaxial with the longitudinal axis of the scope.

In one embodiment of the device, the base member is removably connected to the sleeve. In another embodiment, the diameter of the cylindrical aperture is equal to or greater than the diameter of the scope.

In accordance with common practice, it should be understood that the drawings are not necessarily to scale and that the embodiments are sometimes illustrated by graphic symbols, phantom lines, diagrammatic representations, and fragmentary views. In certain instances, details which are not necessary for an understanding of embodiments of the present invention or which render other details difficult to perceive may have been omitted. Additionally, as one of ordinary skill in the art would readily understand, the invention is not necessarily limited to the particular embodiments illustrated and described herein.

DETAILED DESCRIPTION

The present disclosure is directed to various types of mounts for securing cameras onto a scope, such as the scope of a firearm or bow. In some embodiments, the disclosure is directed to an apparatus that acts as an accessory to a conventional firearm. In other embodiments, the disclosure is directed to an actual firearm or device that is capable of and designed to store cameras. Generally, the apparatus and device are designed for connecting these cameras to the scope of the firearm while still allowing for an eye view of the target and accurate firing of the firearm viewed through the device. As a result, still photos and video recordings can be taken without a material change or effect on the firearm. As the camera is able to capture photos and video through the scope, it can also be particularly useful for training purposes, such as for a novice hunter or for military and police training.

As will become apparent upon a careful reading of the detailed description of the embodiments discussed herein, the camera mount apparatus and system for a scope provides enhanced stability, a simple means for securing the camera, and the ability to display on the camera the view seen from the scope of a weapon, such as but not limited to, a rifle or firearm. This display provides for a wider field of view and enables the shooter to zoom onto the target. Additionally, a shooter can take photos and videos before, during, and after a target has been located to be later viewed for entertainment or training. With an internet-enabled camera, the shoot can also easily stream, e-mail, text, or post the photos and videos for viewing by friends, family, and colleagues at remote locations.

"Cameras," as used and described herein, generally relate to devices that record and store images and videos, including, but not limited to, digital cameras, camera-enabled Personal Digital Assistants, camera phones, and/or smartphones (e.g., iPhones, BlackBerrys®, Nokia N8, Motorola Droid, and the like). "Shooter," as used and described herein, generally relates to a hunter; however, one of ordinary skill in the art would readily recognize that the embodiments disclosed herein are also very useful for other applications, including, but not limited to, military, police, security, target shooting, and any other application where a photo or recording of a shot could be utilized. "Hunt," as used and described herein, generally relates to the practice of pursuing any living thing (usually wildlife) for food, recreation, or trade. However, the term is not intended to be limited to conventional "hunting," and could include any use of a firearm, including, but not limited to, shooting at targets or other inanimate objects and/or chasing and potentially shooting a suspect by police or military personnel.

It should also be noted that a conventional rifle is shown as the firearm in the depicted embodiments discussed below. Those skilled in the art, however, would readily appreciate that the camera mount apparatus could be used on any firearm, including, but not limited to, long guns, shotguns, automatic rifles, assault rifles, machine guns, handguns, or the like. Additionally, the apparatus could be mounted on any device with a scope, including, for example, a bow, taser, air-soft gun, paintball gun, BB gun, or laser gun.

With reference to FIGS. 1-4, a camera mount apparatus (100) and firearm system will be described according to a first embodiment of the present invention. The apparatus (100) includes an adapter (501) connected to the scope (600) of a firearm (700), a sleeve (500) connected the adapter (501), and a base member (200) in the form of a platform for receiving a camera (800). Both the sleeve (500) and adapter (501) are cylindrically-shaped, hollow and have longitudinal axes extending from the longitudinal axis of the scope (600) with the diameter of the sleeve (500) forming an unobstructed axial bore generally at least as wide as the diameter of the scope (600); thus, allowing for a shooter to see through the sleeve (500) and adapter (501) and into the scope (600). As shown, the adapter (501) operates as connector for connecting the scope (600) and the sleeve (500), with the adapter (501) connecting over the scope (600) and the sleeve (500). In this regard, the adapter (501) is generally made of a material that can be formed to fit securely onto both the scope (600) and the sleeve (500) without the need for additional bonding materials and while maintaining a rigidity sufficient to align the longitudinal axes of the scope (600) and sleeve (500). Examples of such a material include rubber, vulcanized rubber, polyvinyl chloride (PVC), or any other material that can be formed while maintaining a rigidity. Additionally, one of ordinary skill in the art would readily appreciate that the above examples are in no way limiting to the types of available materials. When the sleeve (500) is connected to the scope (600) in this manner, the cylindrical aperture (590) of the sleeve (500) is aligned with scope (600) and the longitudinal axis of the scope (600) is generally coaxial with the longitudinal axis of the sleeve (500).

The sleeve (500) is then connected to the adapter (501) along the same longitudinal axis as the adapter (501). The sleeve (500) is generally comprised of a rigid material, including, but not limited to PVC, metal, or the like. The base member (200) is then connected to the sleeve (500) by any means known to one of ordinary skill in the art, including, but not limited to, glue, welding or any other suitable bonding.

Figure 1:
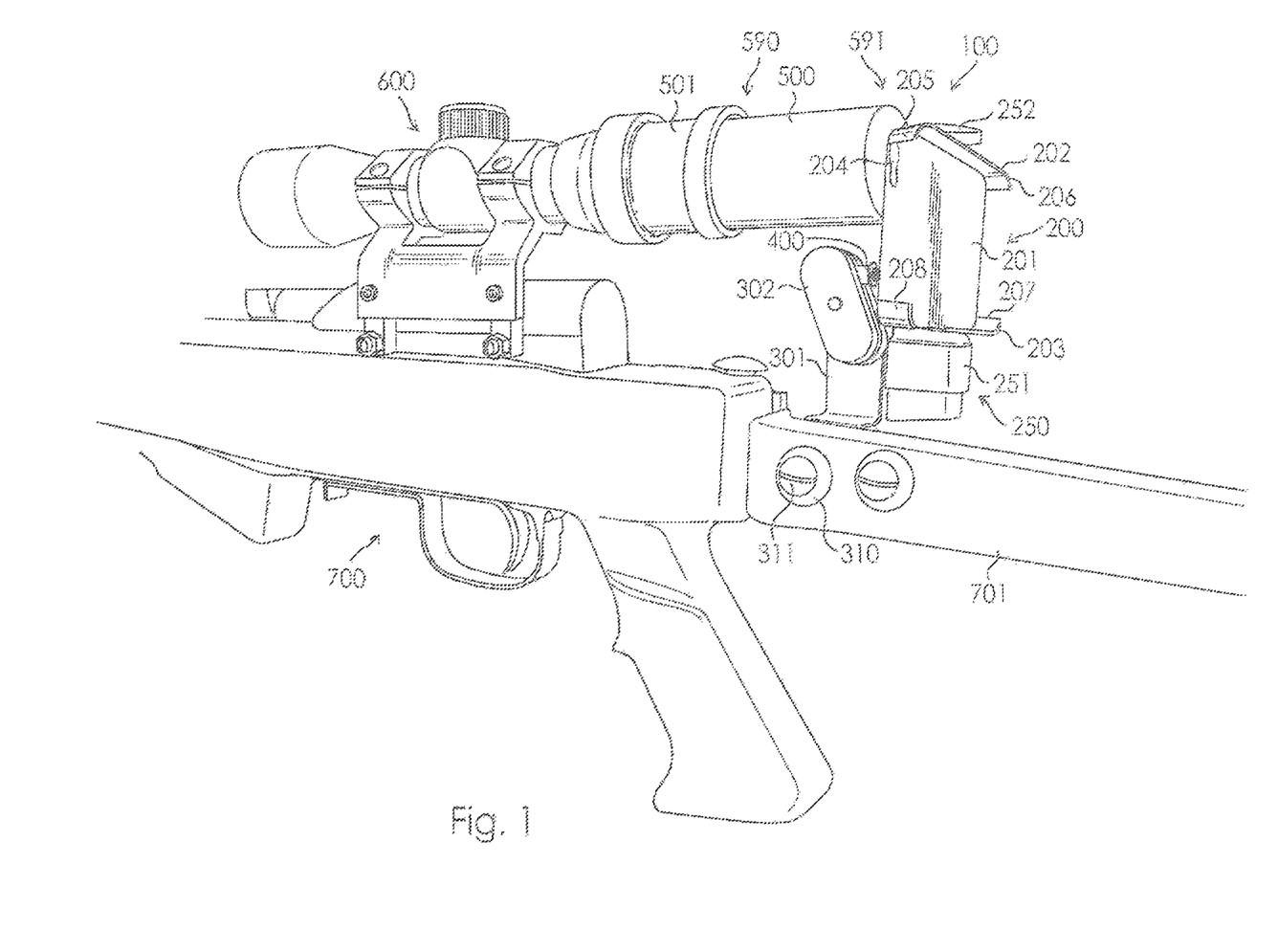
FIG. 1 provides a perspective view of an embodiment of the camera mount apparatus and system connected to the scope of a firearm.
Figure 2:
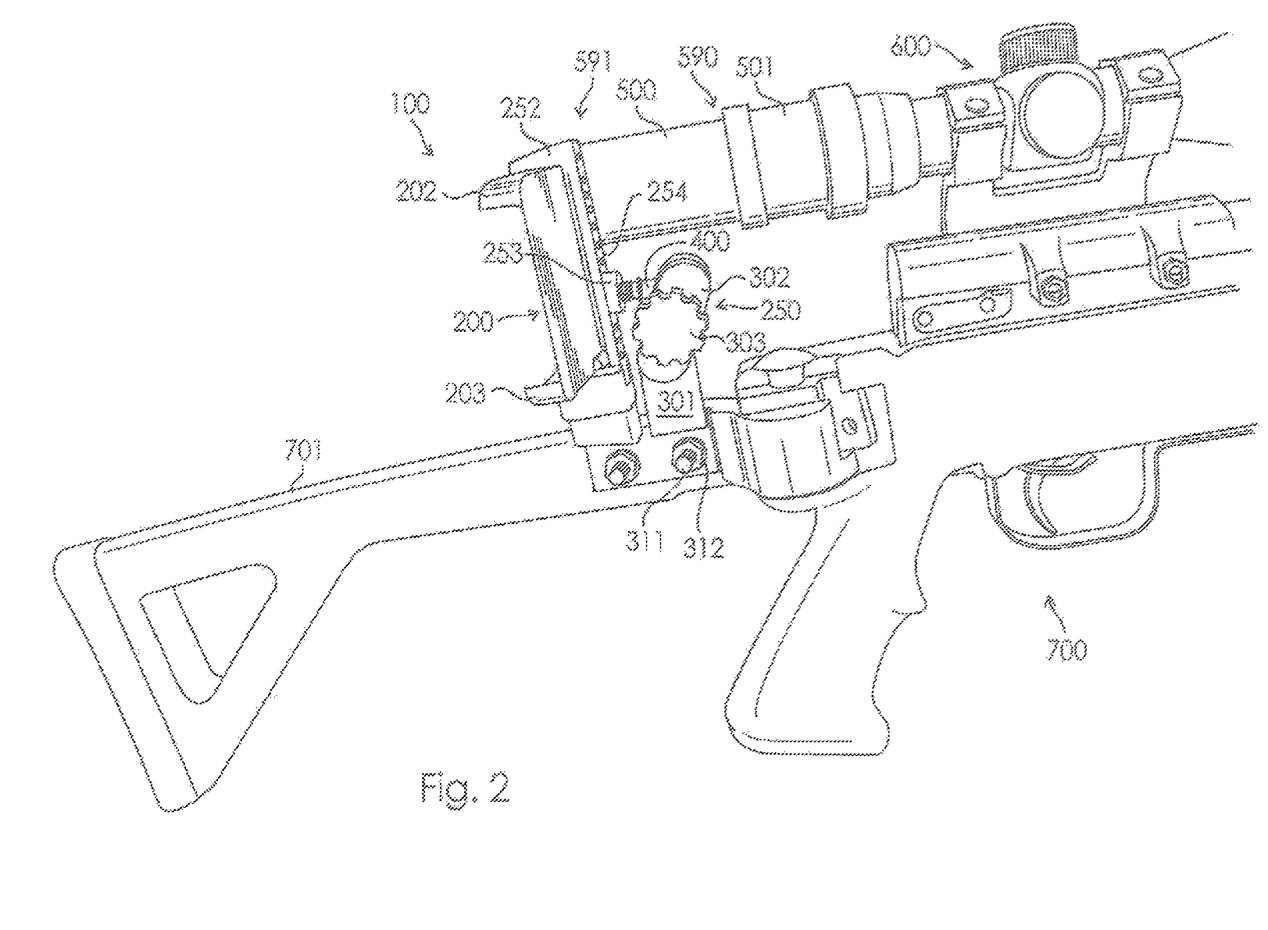
FIG. 2 provides a side view of the embodiment of FIG. 1.
Figure 3:
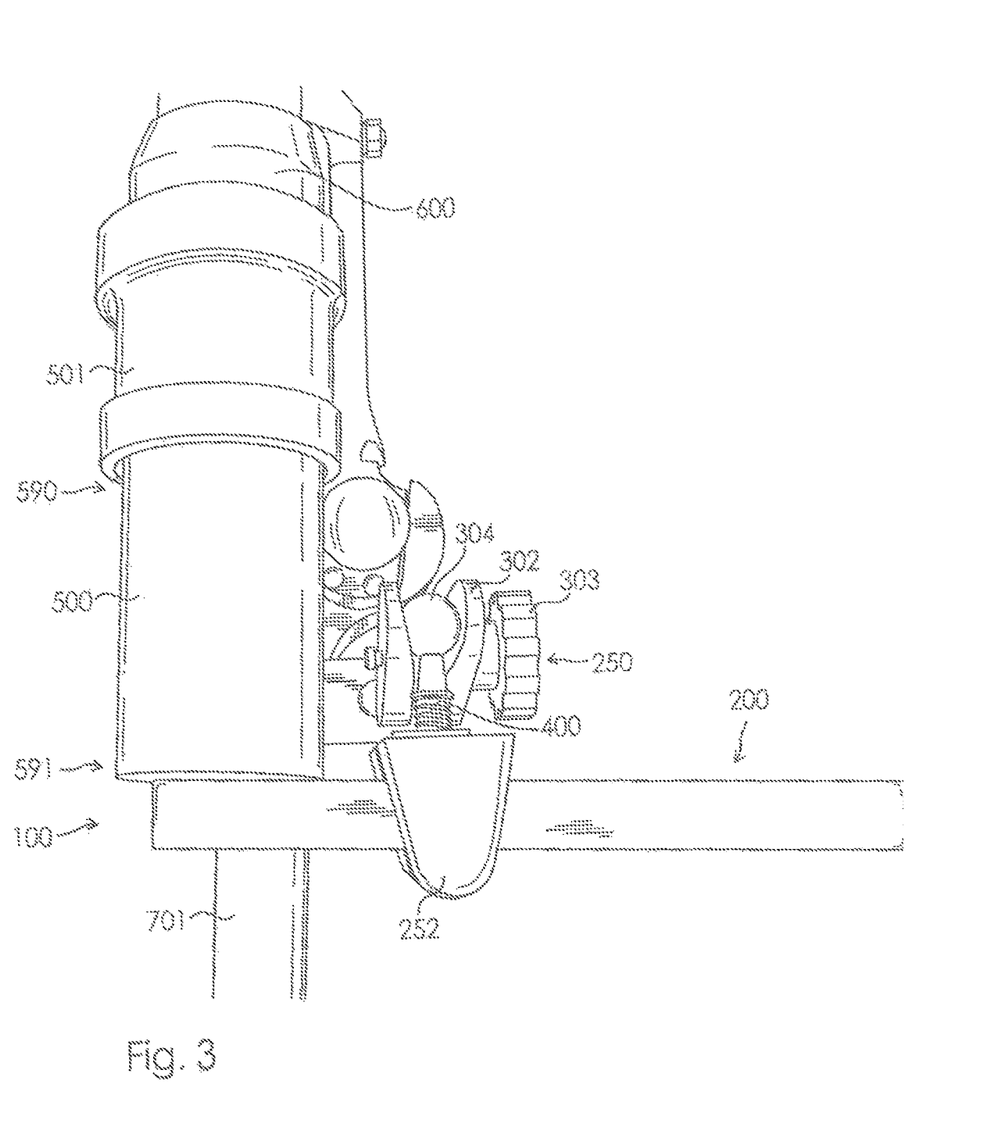
FIG. 3 provides a top view of the embodiment of FIG. 1.
Figure 4:
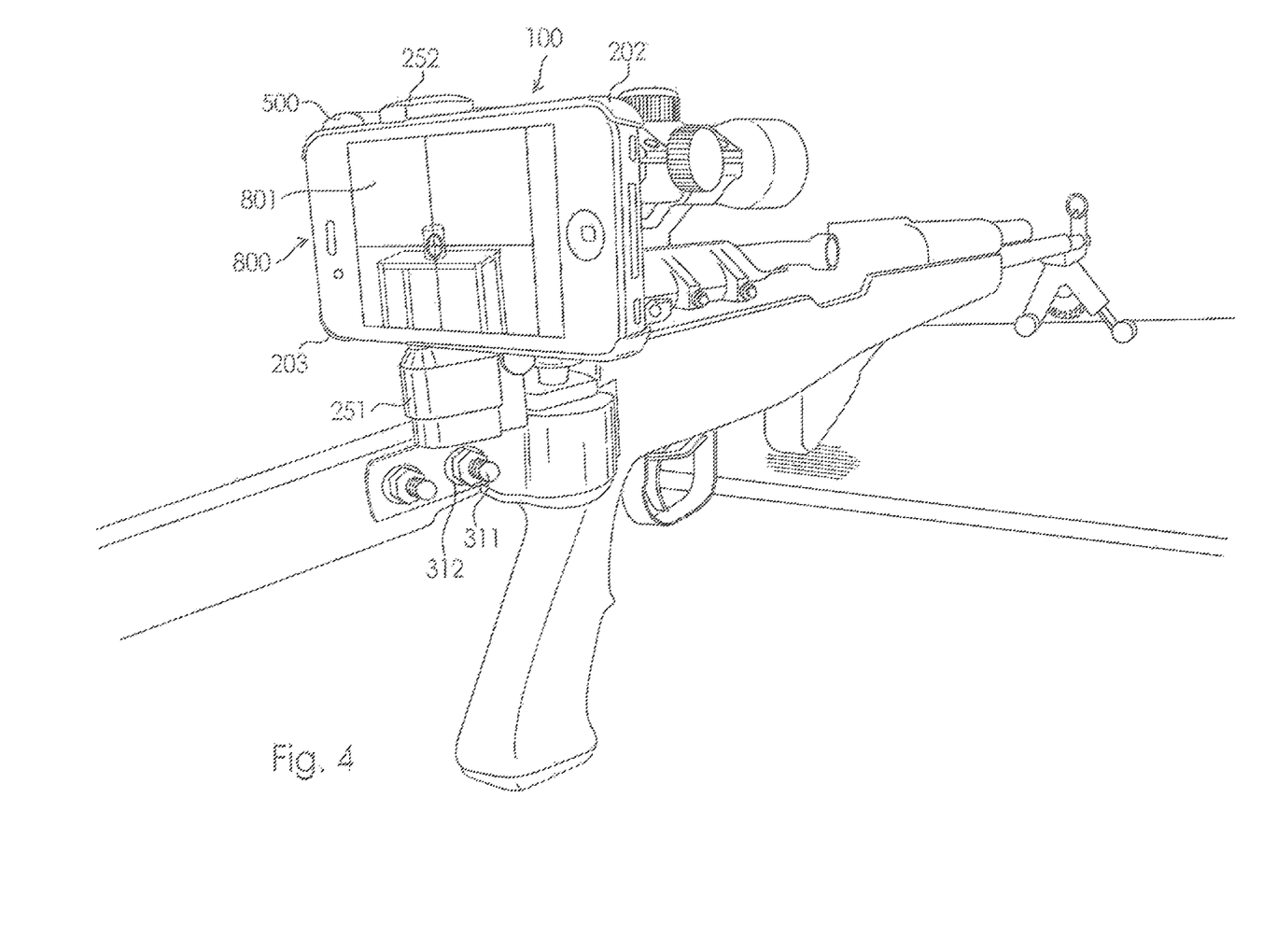
FIG. 4 provides a perspective view of the embodiment of FIG. 1 with a smartphone secured thereto.

The base member (200) is designed to receive the camera (800) and includes a hole (204) to allow the lens of the camera to "see into" the scope (600) of the firearm (700). The base member (200) is positioned adjacent to a second aperture (591) of the sleeve (500) in such a manner that a shooter can see through the hole (204) and into the sleeve (500) and thereby into the scope (600). Stated differently, the lens extends along the longitudinal axis of the scope (600) and sleeve (500). As a result, the screen (801) of the camera (800) displays the view seen from the scope (600) of the firearm (700), as shown in FIG. 4. In this regard, the actual design of the base member (200) can vary depending on the size, shape, and lens position of the camera, but it should be designed to sufficiently receive and secure the camera in a manner that allows the lens to see into the scope (600). In any event, the shooter advantageously would not need to put his or her eye in direct contact with the scope (600) of the firearm (700). Instead, the shooter can now view the target on the screen (801) of the camera (800) and through the scope (600). This allows for an accurate depiction of the target while also displaying a wider field of view, enabling a zoom function, and allowing the shooter to photograph or record the target and the hunt.

In an embodiment, the base member (200) includes a generally planar plate (201) with a hole (204) and flanges ((202) and (203)) extending therefrom and substantially perpendicular to the plate (201). The flanges ((202) and (203)) operate as a means for securing the camera (800) onto the plate (201). In this embodiment, a flatter camera device, such as a smartphone, will generally be used. In an alternative embodiment, however, a camera may be utilized in which the lens of the camera extends through the hole (204). The base member (200) is bonded to the sleeve (500) at approximately the location of the hole (204) of the base member (200), which, as noted above, allows for the lens to see into the scope (600). The camera (800) is placed substantially flush against the plate (201) with the lens aligned with the hole (204) and the flanges ((202) and (203)) securing the camera in place, as shown in FIG. 4. Thus, the screen (801) of the camera (800) can display, photograph, and record the view seen through the scope (600). Such an arrangement is particularly advantageous as it not only allows a shooter to see the scope view on a display screen (801), but it also allows a shooter to later review photos and recordings from the actual view of the scope.

In an embodiment, one flange (202) is at the top of the plate (201) and one flange (203) is at the bottom of the plate (201). This arrangement is by no means necessary, as one of ordinary skill in the art would readily recognize that the flanges could also or alternatively be placed on the sides of the plate (201) and could include any number of flanges. These flanges ((202) and (203)) additionally have rounded corners ((205)-(208)) as a further means for securing the particular camera (800) in place. Again, this particular design of the flanges is by no means necessary, as one of skill in the art would readily recognize that other arrangements and designs of flanges could similarly be used to secure the camera in place. For example, the flanges could be bendable such that once the device is placed against the plate, the flanges could be bent inward to secure the camera into place. The edges of the flanges may also be slightly indented in order to receive and secure the camera. In the depicted embodiments, the flanges ((202) and (203)) are sized and shaped such that the camera (800) can securely snap into place. To remove the camera (800) from the base member (201), a shooter can simply snap the camera (800) out of place. It should also be noted that the means for securing the camera (800) in place is not limited to the flanges, as one of ordinary skill in the art would readily appreciate, and could include, for example, adhesives, bands, clamps, contoured cases, fasteners, or the like.

In certain embodiments, the apparatus (100) also may include a stabilizer (250). One of ordinary skill in the art would readily appreciate that this stabilizer (250) is by no means necessary as the apparatus (100) in FIGS. 1-4 may merely be comprised of the base member (200) and a means for connecting the base member to the scope, which provides all the benefits described above. In fact, in many embodiments, the stabilizer (250) may not be feasible, for example, if the firearm (700) in FIGS. 1-4 did not have a stock (701), or as shown in FIGS. 5-9 and described below.

However, for certain embodiments and with certain types of firearms, a stabilizer (250) advantageously helps secure the camera (800) onto the plate (201) of the base member (200). The stabilizer (250) generally includes an adjustable top clamp (252) and adjustable bottom clamp (251) both connected to a back panel (254) with a receiving nut (253), a screw (400) attached to an adjuster (302) for threading into the receiving nut (253), and a support (301) attached to the adjuster (302) for securing the stabilizer (250) onto the firearm (700). In an embodiment, the support (301) is attached to the stock (701) of the firearm (700). The support (301) can be attached by any sufficient means for securing the support (301). In the depicted embodiment, the support (301) is attached with a bolt (311) and washer (310) and secured with a nut (312). This type of fastening, however, is by no means the only available fastening as one of ordinary skill in the art would readily appreciate.

The clamps ((252) and (251)) are movably and adjustably connected to the back panel (254). As noted above, the back panel (254) also includes a receiving nut (253). As discussed more below, when the receiving nut (253) is loosened, the clamps ((252) and (251)) can be adjusted by sliding the clamps along the vertical axis of the back panel (254). This allows the clamps ((252) and (254)) to be tightened once the camera (800) is in place.

The adjuster (302) includes a ball-bearing (304) there within and a thumbscrew (303) which serves to thread the screw (400) to tighten and loosen the receiving nut (253) such that the adjustable top clamp (252) and adjustable bottom clamp (251) can be moved up and down along the vertical axis of the back panel (254) to help secure the camera (800) in place. In other words, when the thumbscrew (303) is loosened, the clamps ((252) and (251)) can easily slide and be adjusted. Thus, a shooter can loosen the thumbscrew (303), snap the camera (800) on the plate (201), adjust the clamps ((252) and (251)) into place, and then tighten the thumbscrew (303) in order to secure the camera (800) into place with the now tightened clamps ((252) and (251)). To remove the camera (800), the shooter simply unscrews the thumbscrew (303), slides the clamps ((252) and (251)), and snaps the camera out of the base member (200).

As similarly described above, it is important to note, as one of ordinary skill in the art would readily appreciate, the stabilizer (including the clamps, back panel, receiving nut, screw, adjuster, and support) is by no means necessary.

Turning now to FIGS. 5-8, a camera mount apparatus (2100) and firearm system will be described according to an embodiment of the present invention. This embodiment is similar to the embodiment discussed above in reference to FIGS. 1-4 in that the apparatus (2100) connects to the scope (2600) of a firearm (2700) to allow a camera (2800) to display, photograph, and/or record the view seen from the scope (2600). In this embodiment, however, the stabilizer is omitted. Additionally, this embodiment includes other means for securing the apparatus (2100) to the scope (2600) and for securing the camera (2800) to the apparatus (2100), among other differences discussed more fully below.

The apparatus (2100) includes a sleeve (2500) connected to the scope (2600) by means of an adapter (2501) and a base member (2200) in the form of a platform for receiving an camera (2800) with the base member (2200) removably connected to sleeve (2500) by means of a receiver (2504). The sleeve (2500) and adapter (2501) are cylindrically-shaped, hollow and have longitudinal axes extending from the longitudinal axis of the scope (2600) with the diameter of the sleeve (2500) forming an unobstructed axial bore generally at least as wide as the diameter of the scope (2600); thus, allowing for a shooter to see through the sleeve (2500) and adapter (2501) and into the scope (2600). These components are connected in such a manner that that the apparatus (2100) can be attached easily to scopes of varying sizes. Additionally, as the base member (2200) is removably connected, different types and sizes of base members can be utilized and changed with ease. As a result, a user can seamlessly remove and change the base member (2200) to secure the camera of choice.

As shown, the adapter (2501) operates as a connector for connecting the sleeve (2500) to the scope (2600), with the sleeve (2500) securely connecting over the top of the adapter (2501) and along the same longitudinal axis as the adapter (2501). The sleeve (2500) is secured to the adapter (2501) with screw fasteners (2503), which further operate as a means for connecting the sleeve (2500) to the scope (2600). When the sleeve (2500) is connected to the scope (2600) in this manner, the cylindrical aperture (2590) of the sleeve (2500) is aligned with scope (2600) and the longitudinal axis of the scope (2600) is generally coaxial with the longitudinal axis of the sleeve (2500). The receiver (2504) is similarly connected to the sleeve (2500) with screw fasteners (2505) and along the same longitudinal axis. The receiver (2504), however, is by no means necessary. For example, the base member (2200) could alternatively be directly and removably connected to the sleeve (2500).

The sleeve (2500), adapter (2501), and receiver (2504) are generally comprised of a rigid material, including, but not limited to PVC, metal, or the like. The base member (2200) is then removably connected to the receiver (2504). As noted above, this removable connecting mechanism allows varying sizes and types of base members, and thereby varying sizes and types of cameras, to be utilized with the apparatus. For example, a base member may have a hole in the center to be used in conjunction with an camera with a similarly central lens.

Figure 5:
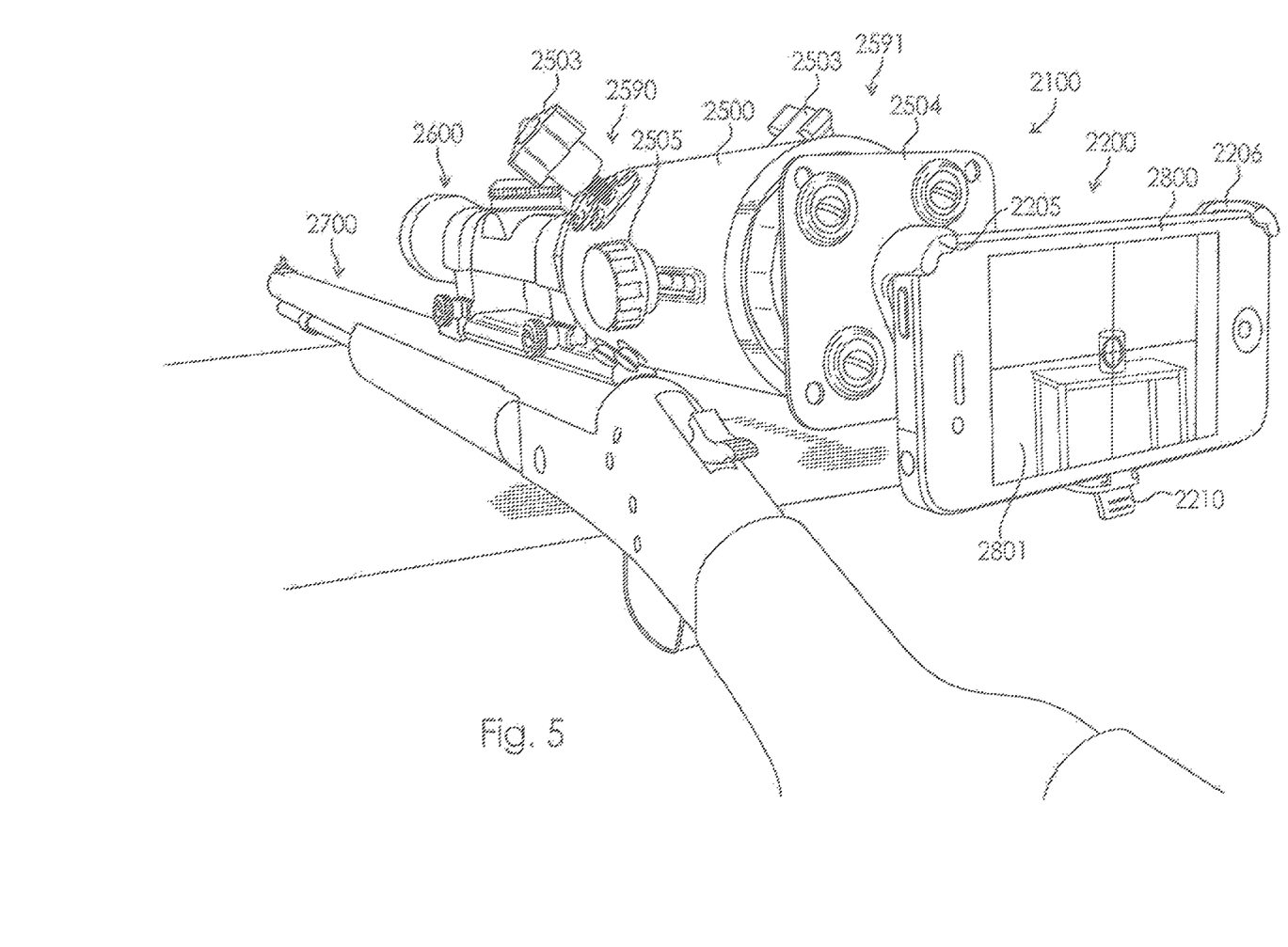
FIG. 5 provides a perspective view of a second embodiment of the camera mount apparatus and system with a smartphone secured thereto and connected to the scope of a firearm.

The base member (2200) is designed to receive the camera (2800) and includes a hole to allow the lens of the camera to "see into" the scope (2600) of the firearm (2700). The base member (2200) is connected to the receiver (2504), and thereby positioned adjacent to a second aperture (2591) of the sleeve (2500), in such a manner that a shooter can see through the hole and into the receiver (2504), sleeve (2500), and adapter (2501), and thereby into the scope (2600). Stated differently, the lens extends along the longitudinal axis of the scope (2600) and sleeve (2500). As a result, the screen (2801) of the camera (2800) displays the view seen from the scope (2600) of the firearm (2700), as shown in FIG. 5. In this regard, and as noted above, the actual design of the base member (2200) and the position of the hole can vary depending on the size, shape, and lens position of the camera, but it should be designed to sufficiently receive and removably secure the camera in a manner that allows the lens to see into the scope (2600). In any event, the shooter advantageously would not need to put his or her eye in direct contact with the scope (2600) of the firearm (2700) with the apparatus (2200) of the present disclosure. Instead, the shooter can now view the target on the screen (2801) of the camera (2800) and through the scope (2600). This allows for an accurate depiction of the target while also displaying a wider field of view, enabling a zoom function, allowing the shooter to photograph or record the target and the hunt.

Figure 6:
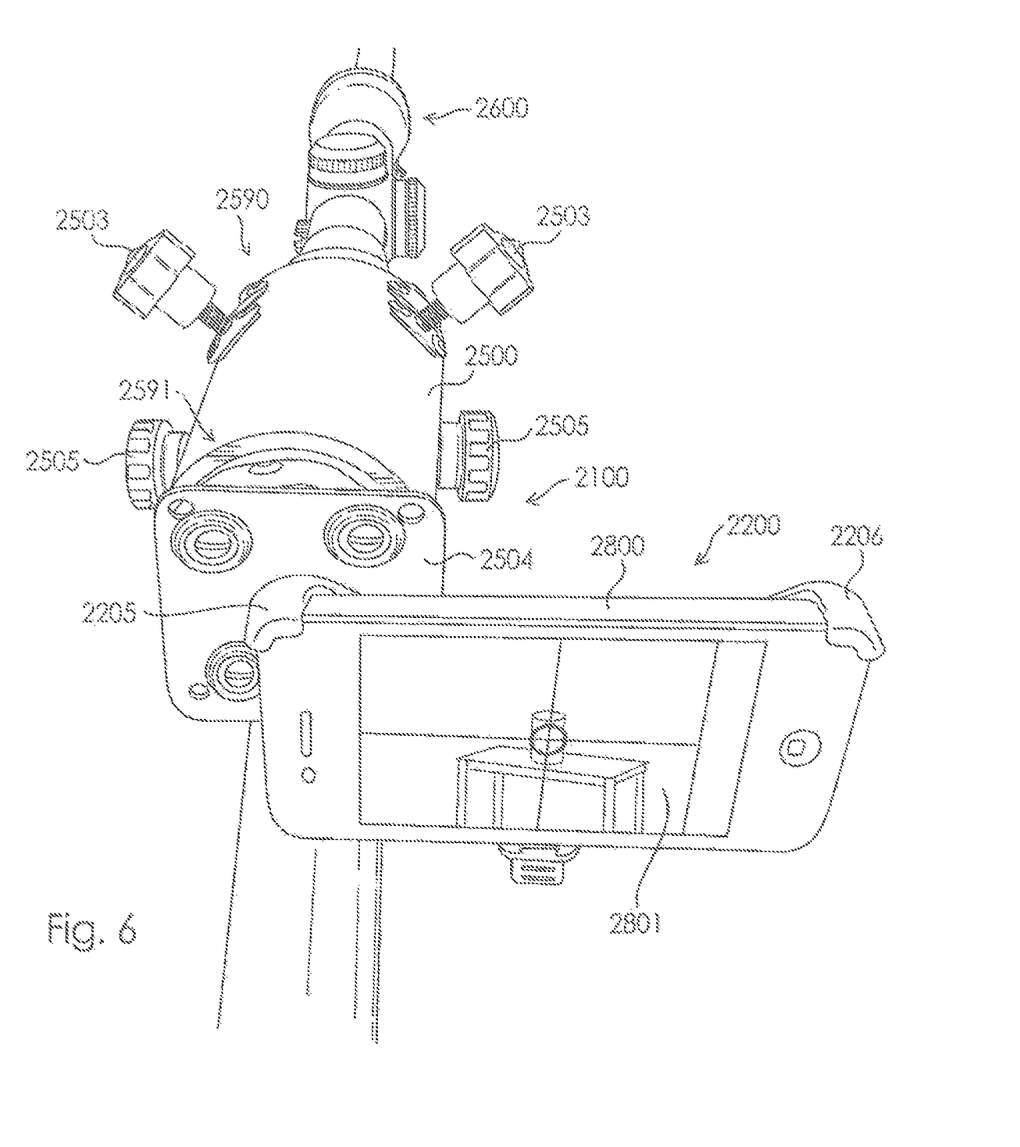
FIG. 6 provides a rear view of the embodiment of FIG. 5.
Figure 7:
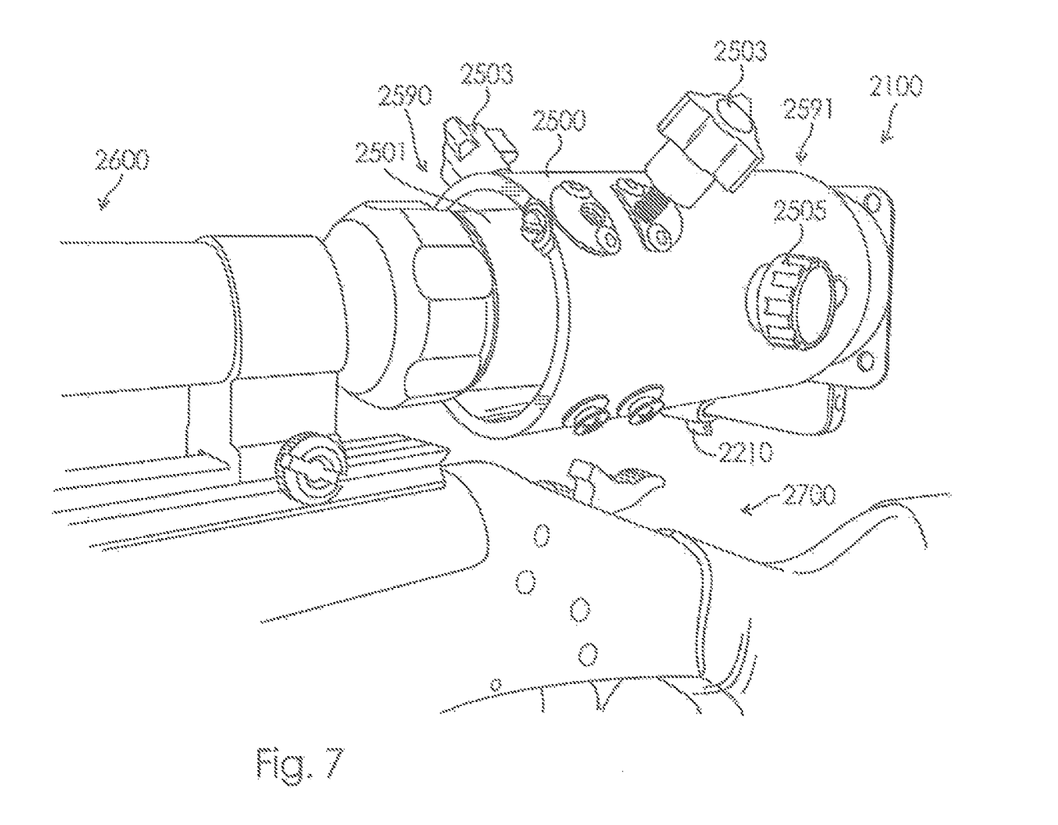
FIG. 7 provides a front-side perspective view of the embodiment of FIG. 5.
Figure 8:
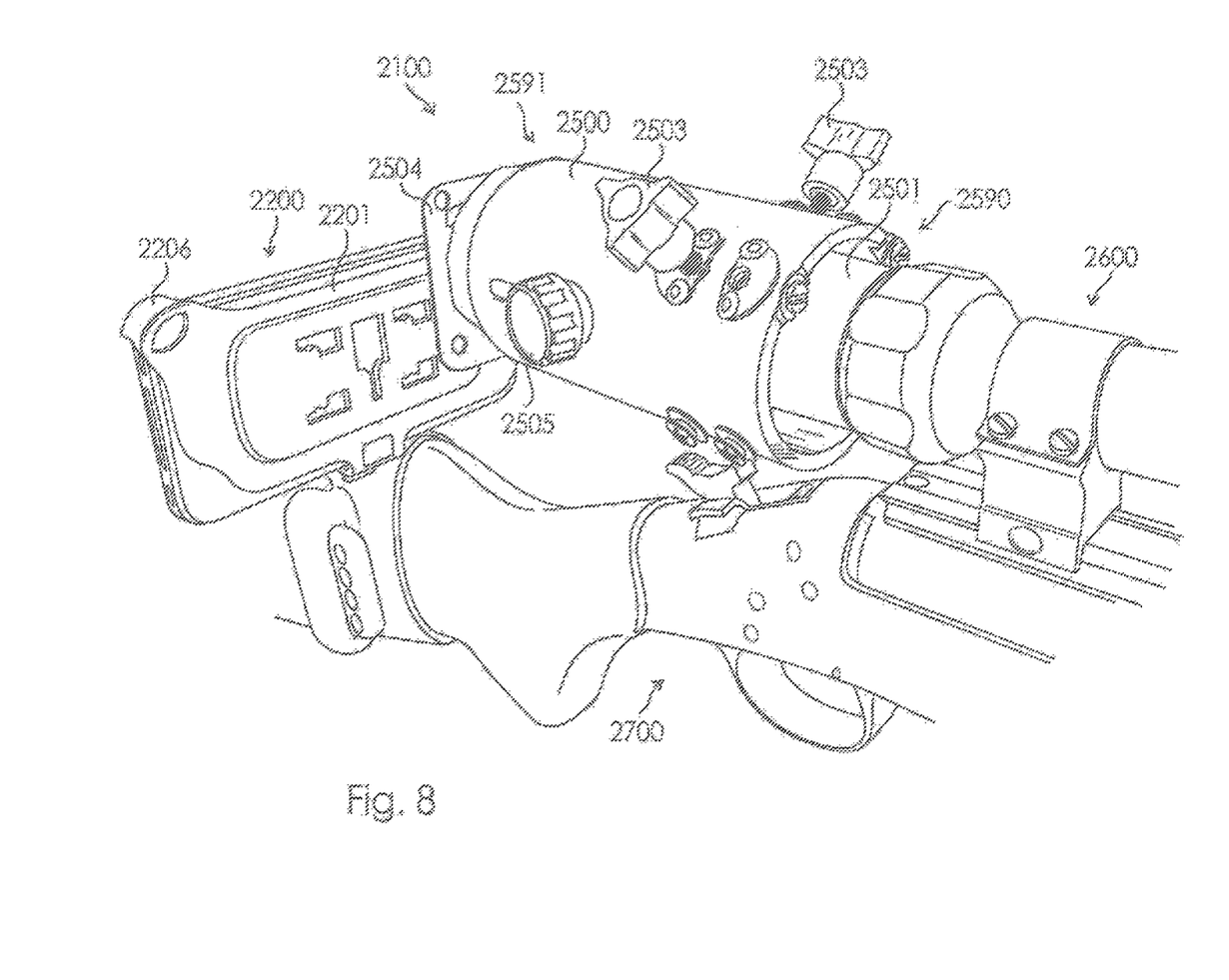
FIG. 8 provides a rear-side perspective view of the embodiment of FIG. 5.

In an embodiment, the base member (2200) includes a generally planar plate (2201) with a hole, flanges ((2205) and (2206)) extending from the top end of the plate (2201) and substantially perpendicular to the plate (2201), the flanges ((2205) and (2206)) comprising rounded corners, and a clamp (2210). The flanges ((2205) and (2206)) and clamp (2210) operate as a means for securing the camera (2800) onto the plate (2201). The base member (2200) is connected to the receiver (2204) at approximately the location of the hole of the base member (2200), which, as noted above, allows for the lens to see into the scope (2600). The camera (2800) is placed substantially flush against the plate (2201) with the lens aligned with the hole and the rounded corners of the flanges ((2205) and (2206)) and the clamp (2210) all securing the camera in place, as shown in FIGS. 5-6. In this regard, the clamp (2210) is generally adjustable or bendable and is adapted to receive and help secure the camera (2800) in place. Thus, with this arrangement, and as noted above, the screen (2801) of the camera (2800) can display, photograph, and record the view seen through the scope (2600), and additionally, this arrangement advantageously not only allows a shooter to see the scope view on a display screen (2801), but it also allows a shooter to later review photos and recordings from the actual view of the scope.

In the depicted embodiments, the flanges ((2202) and (2203)) are sized and shaped such that the camera (2800) fits into place on the plate (2201). As noted above, in this embodiment, the flanges ((2202) and (2203)) are in the shape of rounded corners. To remove the camera (2800) from the base member (2201), a shooter can simply bend or adjust the clamp (2210) and slide the camera (2800) out of place. This particular design of the flanges and clamp is by no means necessary, as one of skill in the art would readily recognize that other arrangements and designs of flanges could similarly be used to secure the camera in place. For example, the flanges also could be bendable such that once the device is placed against the plate, the flanges could be bent inward to secure the camera into place. The edges of the flanges may also be slightly indented in order to receive and secure the camera. It should also be noted that the means for securing the camera in place is not limited to the flanges, as one of ordinary skill in the art would readily appreciate, and could include, for example, adhesives, bands, clamps, contoured cases, fasteners, or the like.

Figure 9:
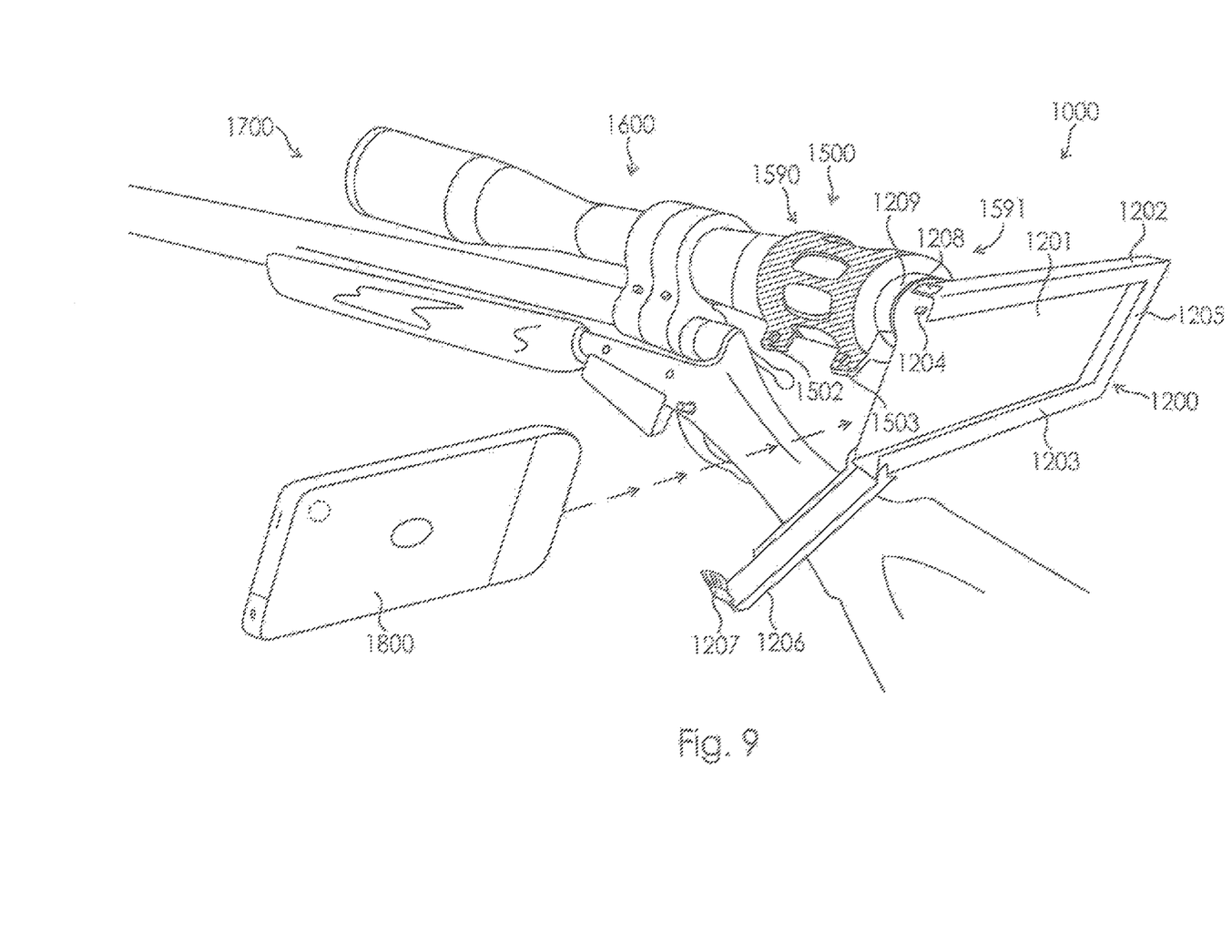
FIG. 9 provides a perspective view of a third embodiment of the camera mount apparatus and system connected to the scope of a firearm.

Turning now to FIG. 9, a camera mount apparatus (1000) and firearm system will be described according to another embodiment of the present invention. This embodiment is similar to the embodiments discussed above in reference to FIGS. 1-8 in that the apparatus (1000) connects to the scope (1600) of a firearm (1700) to allow an camera (1800) to display, photograph, and/or record the view seen from the scope (1600). In this embodiment, however, the stabilizer and the adapter are omitted and a hinged flange (1206) is included as a means for securing the camera (1800), among other differences. The apparatus (1000) includes a base member (1200) with an insertion tube (1209) connected directly to the sleeve (1500), which is in turn connected to the scope (1600) of a firearm (1700). Again the sleeve (1500) is cylindrically shaped, hollow and has a longitudinal axis extending from the longitudinal axis of the scope (1600); thus, allowing for a shooter to see through the sleeve (1500) and into the scope (1600).

As shown, the sleeve (1500) is adjustably connected over the scope (1600) and insertion tube (1209) of the base member (1200). In this regard, the sleeve (1500) will generally contain a tightening mechanism to secure both the sleeve (1500) onto the scope (1600) and the insertion tube (1209) of the base member (1200) onto the sleeve (1500). In the depicted embodiments, the sleeve (1500) includes rims (1503) comprised of two mirrored pieces extending substantially perpendicular from the sleeve (1500) with the rims (1503) operating as a connector for connecting the sleeve (1500) to both the scope (1600) and the base member (1200). Thus, the sleeve (1500) can be placed over the scope (1600) on one end and then over the insertion tube (1209) of the base member (1200) on the other end. The pieces of the rims (1503) are then pinched together and tightened with screws (1502) to secure the base member (1200) onto the sleeve (1500) and thereby onto the scope (1600). When the sleeve (1500) is connected to the scope (1600) in this manner, the cylindrical aperture (1590) of the sleeve (1500) is aligned with the scope (1600) and the longitudinal axis of the scope (1600) is generally coaxial with the longitudinal axis of the sleeve (1500). The sleeve (1500) and rims (1503) are generally comprised of a rigid material, including, but not limited to PVC, metal, or the like.

The base member (1200) is designed to receive the camera (1800) and includes a bore or hole (1204) to allow the lens of the camera to "see into" the optical device or scope (1600) of the firearm (1700) and includes an insertion tube (1209). The insertion tube (1209) of the base member (1200) is secured to the sleeve (1500) at the second aperture (1591) of the sleeve (1500), as discussed above, and in such a manner that a shooter can see through the hole (1204) and into the sleeve (1500) and thereby into the scope (1600). Stated differently, the lens extends along the longitudinal axis of the scope (1600) and sleeve (1500). As a result, the screen (1801) of the camera (1800) displays the view seen from the scope (600) of the firearm (700), as similarly discussed above. Again, as similarly discussed above in reference to FIGS. 1-9, the actual design of the base member (1200) can vary depending on the size, shape, and lens position of the camera, but it should be designed to sufficiently receive and secure the camera in a manner that allows the lens to see into the scope (1600). In any event, the shooter advantageously would not need to put his or her eye in direct contact with the scope (1600) of the firearm (1700). Instead, the shooter can now view the target on the screen (1801) of the camera (1800) and through the scope (1600). This allows for an accurate depiction of the target while also displaying a wider field of view, enabling a zoom function, and allowing the shooter to photograph or record the target and the hunt.

In an embodiment, the base member (1200) includes a generally planar plate (1201) with a bore or hole (1204), flanges ((1202), (1203) and (1205)) extending therefrom and substantially perpendicular to the plate (1201), and a hinged flange (1206) hingedly connected to the plate (1201) for securing the camera (1800) in place. The base member (1200) is connected to the sleeve (1500) at approximately the location of the hole (1204) of the base member (1200), which, as noted above, allows for the lens to see into the scope (1600). The hinged flange (1206) is hinged open and the camera (1800) is slid onto the plate (1201) with the lens aligned with the hole (1204) and the flanges ((1202), (1203) and (1205)) securing the camera in place. The hinged flange (1206) is then locked into place to secure the camera in place. In this regard, the hinged flange (1206) includes a tab (1207) which snaps easily on and off the receiver (1208) connected to the top flange (1202). Once in place, the screen (1801) of the camera (1800) can display, photograph, and record the view seen through the scope (1600). Such an arrangement is particularly advantageous as it not only allows a shooter to see the scope view on a display screen (1801), but it also allows a shooter to later review photos and recordings from the actual view of the scope.

In an embodiment, the top flange (1202) is at the top of the plate (1201), the bottom flange (1203) is at the bottom of the plate (1201), and the side flange (1205) and hinged flanged (1206) are at the sides of the plate (1201). This arrangement is by no means necessary, as one of ordinary skill in the art would readily recognize that the flanges could alternatively include any number of flanges and the hinged flange (1206) could be located on either side, the top, or the bottom of the plate (1201). Additionally, these flanges ((1202), (1203) and (1205)) are in the shape of an "L" to help secure the particular camera (1800) in place. Again, this particular design of the flanges is by no means necessary, as one of skill in the art would readily recognize that other arrangements and designs of flanges could similarly be used to secure the camera in place. For example, the flanges could be bendable such that once the device is placed against the plate, the flanges could be bent to secure the camera into place, or the edges of the flanges may also be slightly indented in order to receive and secure the camera. In the depicted embodiments, the flanges ((1202), (1203) and (1205)) are sized and shaped in the form of an "L" such that the camera (1800) can securely slide into place. To remove the camera (1800) from the base member (1201), a shooter can simply slide the camera (1800) out of place.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

What is claimed is:

1. An apparatus for capturing images and recordings through an optical device, the apparatus comprising:
    a sleeve for connecting to an optical device, the sleeve having a hollow longitudinal axis forming an unobstructed axial bore;
    a cylindrical aperture at one end of the sleeve, the cylindrical aperture having a longitudinal axis generally coaxial with the longitudinal axis of the sleeve;

a second aperture at the opposite end of the sleeve, the second aperture having a longitudinal axis generally coaxial with the longitudinal axis of the cylindrical aperture; and a base member including a substantially planar plate connected to said sleeve, said base member having a bore positioned adjacent to the second aperture;

wherein said bore aligns with the cylindrical aperture, the longitudinal axis of the sleeve and the longitudinal axis of the second aperture.

2. The apparatus of claim 1, wherein the base member is removably connected to the sleeve.

3. The apparatus of claim 1, wherein the diameter of the cylindrical aperture is equal to or greater than a diameter of an eyepiece of an optical device.

4. An apparatus for mounting a camera to an optical device, the apparatus comprising:

an adaptor having a first end to couple to an optical device and a second end to couple to a camera, said first end including a cylindrical sleeve and said second end including a base member;

said cylindrical sleeve having a longitudinal axis;

a first aperture extending between said first and second end, said first aperture having a longitudinal axis generally coaxial with the longitudinal axis of said cylindrical sleeve;

said base member including a substantially planar plate having a second aperture aligned with said first aperture;

wherein when said cylindrical sleeve couples to the optical device and said base member couples to the camera, the longitudinal axis of said first aperture is aligned with a longitudinal axis of a camera lens.

5. The apparatus of claim 4, further comprising flanges extending substantially perpendicular from the plate of said base member, wherein said flanges are sized and shaped to secure the camera to said base member.

6. The apparatus of claim 5, further comprising a clamp adapted to receive the camera.

7. The apparatus of claim 5, further comprising a flange hingedly connected to the plate.

8. The apparatus of claim 4, further comprising a means for securing the camera onto said base member.

9. The apparatus of claim 4, wherein said base member is removably connected to said sleeve.

10. The apparatus of claim 4, wherein the sleeve couples around an outer diameter of an eyepiece of the optical device.

11. An apparatus for mounting a camera to an optical device, the apparatus comprising:

an adaptor having a first end to couple to an optical device and a second end to couple to a camera, said first end including a coupling member and said second end including a base member;

said coupling member having a longitudinal axis;

a first aperture extending between said first and second end, said first aperture having a longitudinal axis generally coaxial with the longitudinal axis of said coupling member;

the base member including a substantially planar plate having a second aperture aligned with said first aperture;

wherein when said coupling member couples to the optical device and said base member couples to the camera, the longitudinal axis of said first aperture is aligned with a longitudinal axis of a camera aperture.

12. The apparatus of claim 11, further comprising flanges extending substantially perpendicular from the plate of said base member, wherein said flanges are sized and shaped to secure the camera to said base member.

13. The apparatus of claim 12, further comprising a clamp adapted to receive the camera.

14. The apparatus of claim 12, further comprising a flange hingedly connected to the plate.

15. The apparatus of claim 11, further comprising a means for securing the camera onto said base member.

16. The apparatus of claim 11, wherein said base member is removably connected to said sleeve.

17. The apparatus of claim 11, wherein the sleeve couples around an outer diameter of an eyepiece of the optical device.

18. The apparatus of claim 17, wherein the sleeve is segmented.

* * * * *